United States Patent [19]
Patrin

[11] Patent Number: 4,809,891
[45] Date of Patent: Mar. 7, 1989

[54] MOTORCYCLE LUGGAGE RACK

[76] Inventor: Michael C. Patrin, 1853 Case Ave., St. Paul, Minn. 55119

[21] Appl. No.: 124,161

[22] Filed: Nov. 23, 1987

[51] Int. Cl.$^4$ .............................................. B62J 7/04
[52] U.S. Cl. ................................ 224/42.43; 224/32 R; 280/769
[58] Field of Search .......... 224/42.07, 42.43, 42.03 R, 224/30 R, 32 R, 39, 42.04; 280/769; 108/44

[56] References Cited
U.S. PATENT DOCUMENTS
| | | | |
|---|---|---|---|
| 3,220,623 | 11/1965 | Bostwick | 224/32 R |
| 3,286,891 | 11/1966 | Jones, Jr. | 224/39 |
| 3,362,596 | 1/1968 | Bostwick | 224/32 R |
| 4,296,878 | 10/1981 | Ward et al. | 224/39 |

FOREIGN PATENT DOCUMENTS
| | | | |
|---|---|---|---|
| 616511 | 7/1935 | Fed. Rep. of Germany | 224/32 A |
| 894294 | 11/1939 | France | 224/32 R |

Primary Examiner—Renee S. Luebke
Attorney, Agent, or Firm—Jacobson and Johnson

[57] ABSTRACT

A motorcycle luggage rack for attachment behind the rear of a motorcycle having a rear wheel axle with the luggage rack having a platform for holding luggage and the platform having means for attachment to the rear of a motorcycle with the platform having a top surface located at approximately the same distance from the ground as the axle of the motorcycle rear wheel.

9 Claims, 2 Drawing Sheets

MOTORCYCLE LUGGAGE RACK

FIELD OF THE INVENTION

This invention relates generally to carriers and, more specifically, to baggage or luggage carriers for motorcycles.

BACKGROUND OF THE INVENTION

Motorcycles are convenient and fun vehicles for open air touring. One of the drawbacks of motorcycles is that the luggage compartments and racks that are mounted on the rear of the motorcycle seldom have enough room to store articles. To provide extra storage space small two wheel trailers have been connected to the rear of the motorcycle. While the trailer provides extra storage space it also severely reduces gas mileage as well as creating difficulties in parking and driving the motorcycle. In addition trailers produce excessive tire wear on the motorcycle tires resulting in the necessity to replace the rear motorcycle tire after only a few thousand miles. Trailers also pose a storage problem since they are bulky and require floor storage rather than wall storage. The present invention eliminates the need for a trailer through a strategically placed luggage rack.

DESCRIPTION OF THE PRIOR ART

The concept of baggage carriers or luggage racks for motorcycles is well known in the art. Typically, the prior art motorcycle baggage carriers comprise a bag that is mounted above the rear fender of the motorcycle and usually directly behind the driver or the passenger.

The U.S. Pat. No. 4,003,508 shows a baggage carrier having a sleeve to permit the carrier to be attached to the sissy bar which is located above the fender and directly behind the motorcycle seat.

The U.S. Pat. No. 4,125,213 shows a collapsible luggage carrier which is located above the rear fender and is strapped to the backrest of the motorcycle seat.

The U.S. Pat. No. 4,588,114 shows a base for removably mounting a rigid luggage carrier box to the back of a motorcycle.

The U.S. Pat. No. 4,447,088 shows an articulated luggage carrier that mounts above the rear fender. The carrier can be positioned to form a backrest for a passenger riding on the motorcycle or for the driver if their is no passenger.

The U.S. Pat. No. 4,269,335 shows a luggage rack which is located above the rear fender and behind the motorcycle seat. In order to prevent heavy loads on the luggage rack from adding a turning moment about the rear axle the luggage rack is provided with a linkage that permits the user to move the luggage rack forward if their is no passenger on the motorcycle.

The U.S. Pat No. 4,277,008 shows a luggage rack for an ATC vehicle comprising a rack that extends rearwardly above the rear wheels.

The U.S. Pat. No. 4,300,706 shows a similar luggage rack that comprises an integral part of an ATC vehicle.

The U.S. Pat. No. 4,174,795 shows a typical saddlebag carrier or pannier which is mounted laterally of the cycle wheel.

BRIEF SUMMARY OF THE INVENTION

Briefly, the present invention comprises a luggage carrier that mounts rearwardly of the rear wheel of a motorcycle at approximate axle level to provide a platform for hauling luggage and a collapsible bag that rests on the platform and attaches to the motorcycle helmet holders and the seat rest. In an alternate embodiment the platform and luggage bag are made from a rigid material to provide a one piece hard shell luggage bag and platform.

DESCRIPTION OF THE PREFERRED EMBODIMENT

Figure 1:
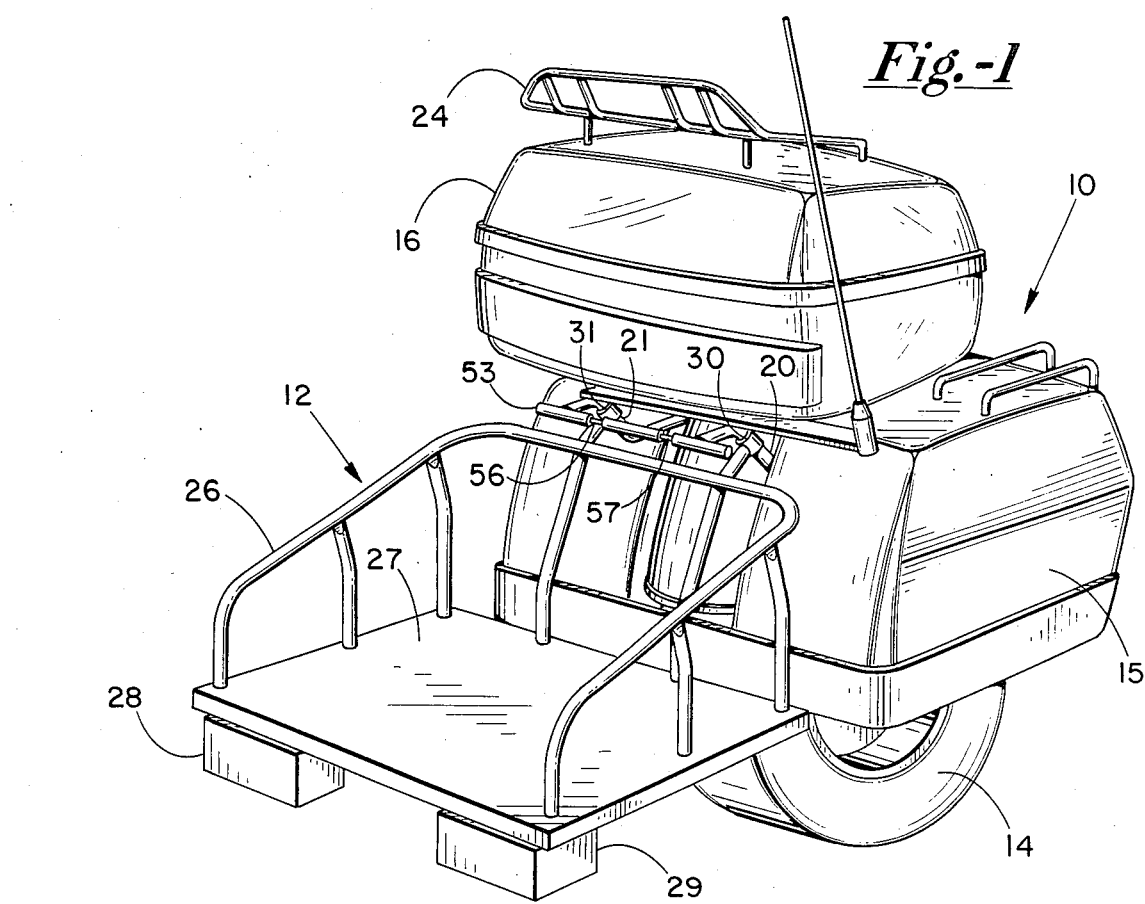
FIG. 1 shows a rear view of my luggage rack mounted on the rear of a motorcycle.

Referring to FIG. 1 reference numeral 10 generally identifies a motorcycle and reference numeral 12 generally identifies the motorcycle luggage carrier of the present invention. Motorcycle 10 has a rear wheel 14 with a fender 15 partially covering wheel 14. Mounted on top of fender 15 is a conventional luggage carrier 16 which has a rack 24 located thereon. Located rearward of rear wheel 14 is luggage platform 12 for carrying luggage and bulky articles. Luggage carrier 12 comprises a flat platform 27 with a support railing 26 extending around three sides of platform 27. Platform 27 and railing 26 are preferably made from a material such as aluminum or the like. Located at the rear of platform 27 is a first taillight 28 and a second taillight 29 which are connected into the electrical system of the motorcycle through a quick disconnect connector (not shown). The taillights at the rear of the motorcycle duplicate the function of the taillights on the motorcycle which may be obscured from view by luggage on the luggage carrier 12.

Figure 2:
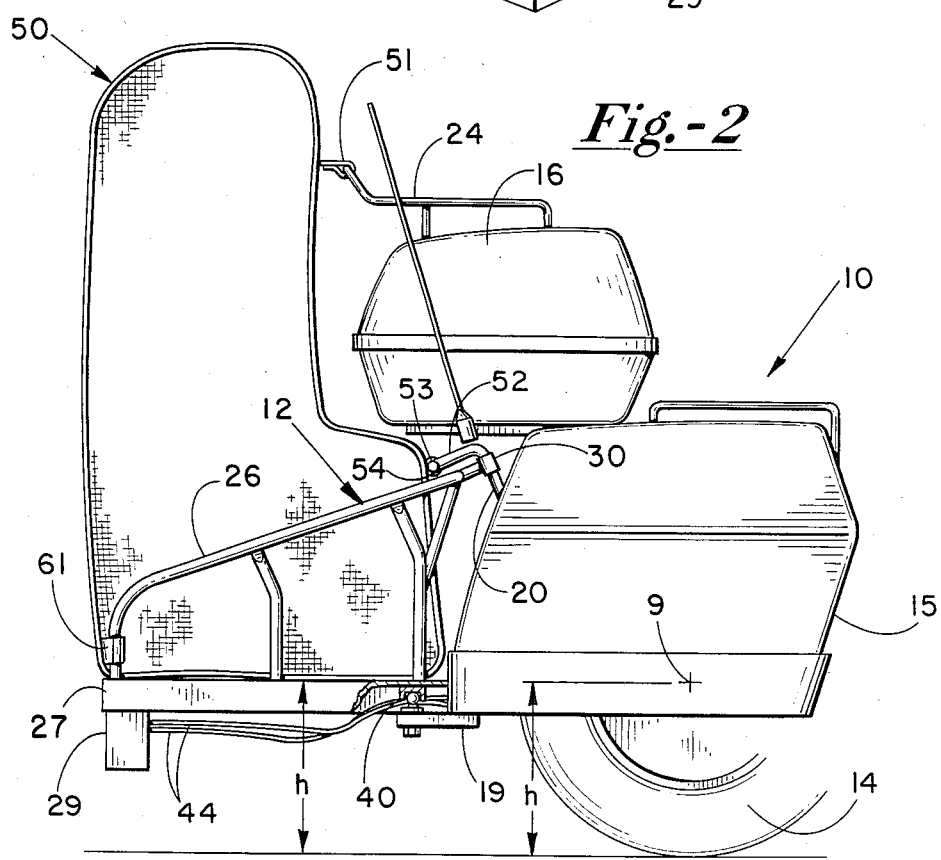
FIG. 2 shows a side view of my luggage rack and collapsible bag mounted on the rear of a motorcycle.

Referring to FIG. 1 and FIG. 2 reference numeral 40 identifies the lower member of a three point hitch to hold luggage rack 12 on motorcycle 10. The three point hitch includes a bolt 40 which fastens platform 27 to motorcycle trailer hitch 19. In the embodiment shown a conventional ball hitch is used to fasten the platform 27 to a trailer hitch 19 on motorcycle 10 ,however, a conventional machine bolt or the like could be used to secure the platform to motorcycle hitch 19. If the motorcycle does not have a hitch one merely extends a support out from the frame of the motorcycle.

In order to provide side supports for luggage on platform 27 there is provided a support railing 26 which prevents lateral and forward movement of luggage on platform 27. Support railing 26 also forms part of the three point hitch of the present invention. The support railing 26 includes a first member or clamp 30 for attaching to a brace 20 extending from motorcycle 10 and a second member or clamp 31 for attaching to a brace 21 extending from motorcycle 10. The three point hitch provides a rigid attachment of the luggage carrier 12 to the rear of motorcycle 10. The rigid attachment insures that the luggage rack and its contents will move with the motorcycle and respond as if the luggage rack is an integral part of the motorcycle. It should be understood that the motorcycles may have different frames ,however,if necessary platform attachment members can be modified to provide the necessary support. I have found that by mounting my luggage rack behind the rear wheel with the platform at approximate axle level I provide a stable luggage platform that does not adversely affect gas mileage or the handling of the motorcycle. FIG. 2 illustrates that both platform 27 and axle 9 are located at a height h from the ground. Mounting platform 27 at approximate axle level of the motorcycle reduces the tendency of the motorcycle to have an unstable or top heavy feeling.

Located on platform 27 is a collapsible luggage bag 50 which is made of a vinyl plastic or the like. Bag 50 has a contoured shape to fit on the platform in an erect position. A strap 51 extends from the front of bag 50 around support 24 to hold the bag in an upright position. Strap 51 has a fastening means such as a buckle or a VELCRO fastener to permit quick attachment or detachment of bag 50 to motorcycle rack 24. The lower portion of bag 50 includes a pair of metal rings 54 which fit into motorcycle helmet holders 53 which are an integral part of conventional motorcycles. The attachment of metal rings 54 to helmet holders 53 is accomplished by folding bag 50 down and then attaching rings 54 beneath pins 56 and 57 on helmet holders 54 which are then locked to securely hold luggage bag 50 on luggage carrier 12.

Figure 3:
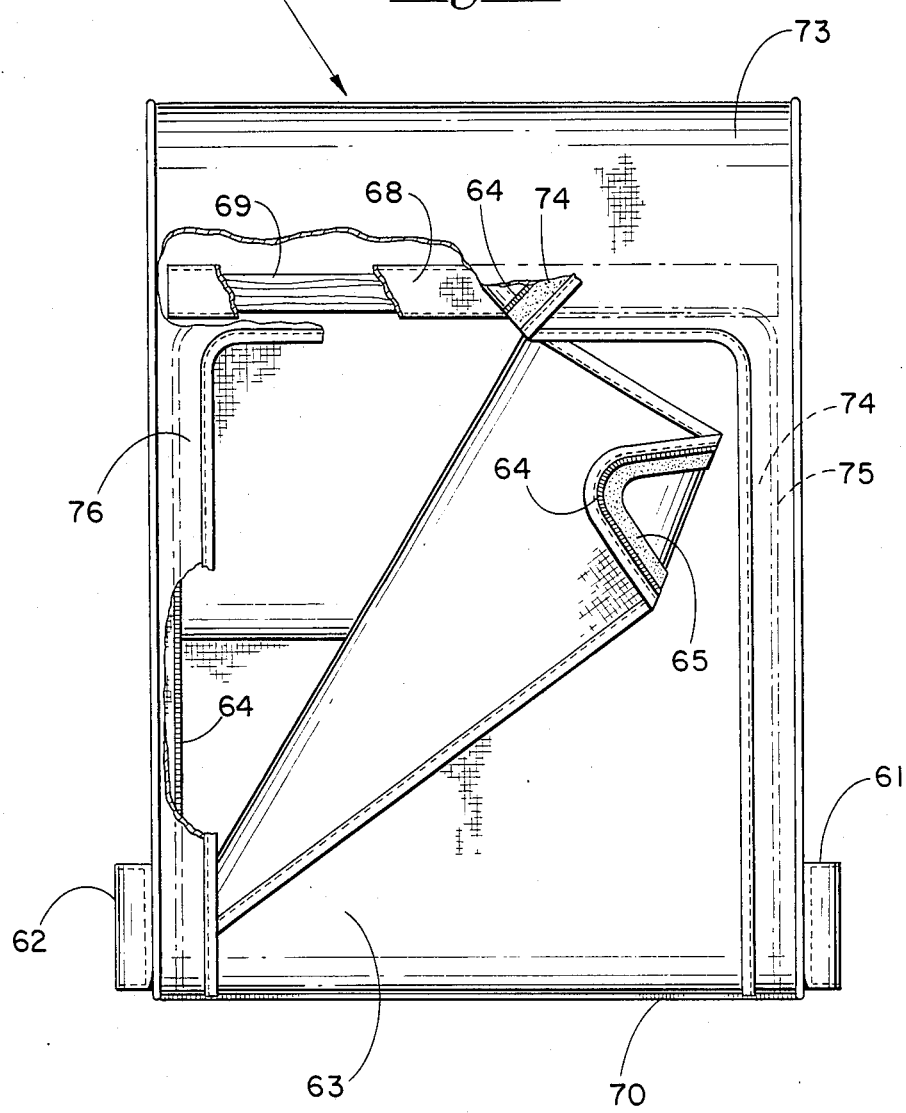
FIG. 3 shows a rear view of my collapsible luggage bag with portions cut away to reveal interior features of the bag.

Referring to FIG. 3 collapsible luggage bag 50 is shown in a rear view with flap 63 in a partially open position. To illustrates the internal features of bag 50 portions of bag 50 have been cut away. Located on the bottom of bag 50 is a reinforcing pad 70 ,which may be carpet or the like, that prevents undue wear on the bottom of bag 50 as it is transported on luggage rack 12. Side strap 61 and side strap 62 hold bag 50 within the confinement of railing 26. Side straps 61 and 62 comprise two strips of material to permit the side straps to fasten around railing 26 and a fastener such as a buckle or a VELCRO material to hold the straps together around railing 26. Flap 63 fastens to back panel 73 through a fastening device 64 consisting of rows of teeth on adjacent edges of an opening that are interconnected by a sliding tab. A protective flap 76 extends over fastening device 64 to keep moisture and dirt out of fastening device 64 in order to prevent the fastening device from jamming. A VELCRO fastener strip 65 is located on flap 63 and a mating VELCRO strip 74 is located on the underside of flap 76 which hold flap 76 to panel 63 to insure that flap 76 maintains it protective relationship over fastening device 64 as the motorcycle is driven. In order to maintain the shape of bag 50 when the bag is empty or partially empty I provide a wood reinforcing strip 69 which fits in a closed pocket 68 that extends sideways across bag 50.

In an alternate embodiment of my invention both the platform and the luggage bag are made from a material such as fiberglass to provide and integral one piece hard shell luggage rack for attachment to the rear of a motorcycle. In order to provide a lower profile the luggage rack may be formed of a height to match the existing luggage storage bins on the motorcycle. In a hard shell motorcycle luggage rack the hard shell luggage rack would form the three point hitch with the motorcycle thus eliminating the need to have a separate attachment such as used with the collapsible bag. If desired the hard shell luggage rack could be mounted on slides to permit quick attachment or detachment of the hard shell luggage rack.

I claim:

1. A motorcyle luggage rack for attachment behind the rear of a motorcycle having a helmet holder and a rear wheel axle comprising:

a platform for holding luggage , said platform having means for attachment of said platform to the rear of the motorcycle, said platform having a top surface located at approximately the same distance from the ground as the axle of the motorcycle rear wheel;

a luggage bag, said luggage bag including a flap to place articles into said luggage bag, said luggage bag including a strap to fasten said luggage bag to said luggage rack and a ring to fasten said luggage bag to the helmet holder on the motorcycle; and further means for holding articles on said platform.

2. The motorcycle luggage rack of claim 1 including tail lights mounted on said luggage rack.

3. The motorcycle luggage rack of claim 1 wherein said means for attachment comprises a three point hitch.

4. The motorcycle luggage rack of claim 3 wherein said further means comprises a railing.

5. The motorcycle luggage rack of claim 1 wherein said luggage bag includes a reinforcing member to provide support for said bag.

6. The motorcycle luggage rack of claim 5 wherein said flap includes a fastener for fastening said flap to said luggage bag.

7. The motorcycle luggage rack of claim 6 wherein said luggage bag includes a protective flap covering said fastener.

8. The motorcycle luggage rack of claim 7 wherein said protective flap includes means for securing said protective flap over said fastener.

9. A motorcyle luggage rack for removable attachment to a trailer hitch located behind the rear axle of a motorcycle comprising:

a stable platform for holding a bulky article , said platform having a front , a first side , a second side and a back said platform having a hitch on said front for rigid attachment of said platform to the trailer hitch on the rear of the motorcycle, said platform having a top surface located at approximately the same distance from the ground as the rear axle a first railing extending upward from said front, a second railing extending upward from said first side and a third railing extending upward from said second side said first railing including a pair of clamps for attaching said railing to the motorcycle, said pair of clamps and said hitch forming a three point hitch, said top surface extending rearwardly and laterally from the motorcycle to provide a region for placing bulky articles laterally and rearwardly of the motorcycle to thereby provide a luggack rack that is located behind the rear wheel of the motorcycle;

tail lights mounted on said back of said luggage rack, said tail lights connected to the motorcycle through a quick disconnect; and said first railing, said second railing, said third railing, and said platform cooperating to hold an article on said platform thereby permitting a motorcycle rider to haul the article on said platform so that said luggage rack and the article on said platform respond as an integral part of the motorcycle.

* * * * *